March 27, 1934.  C. C. FARMER  1,953,009
FLUID PRESSURE BRAKE
Filed June 24, 1932
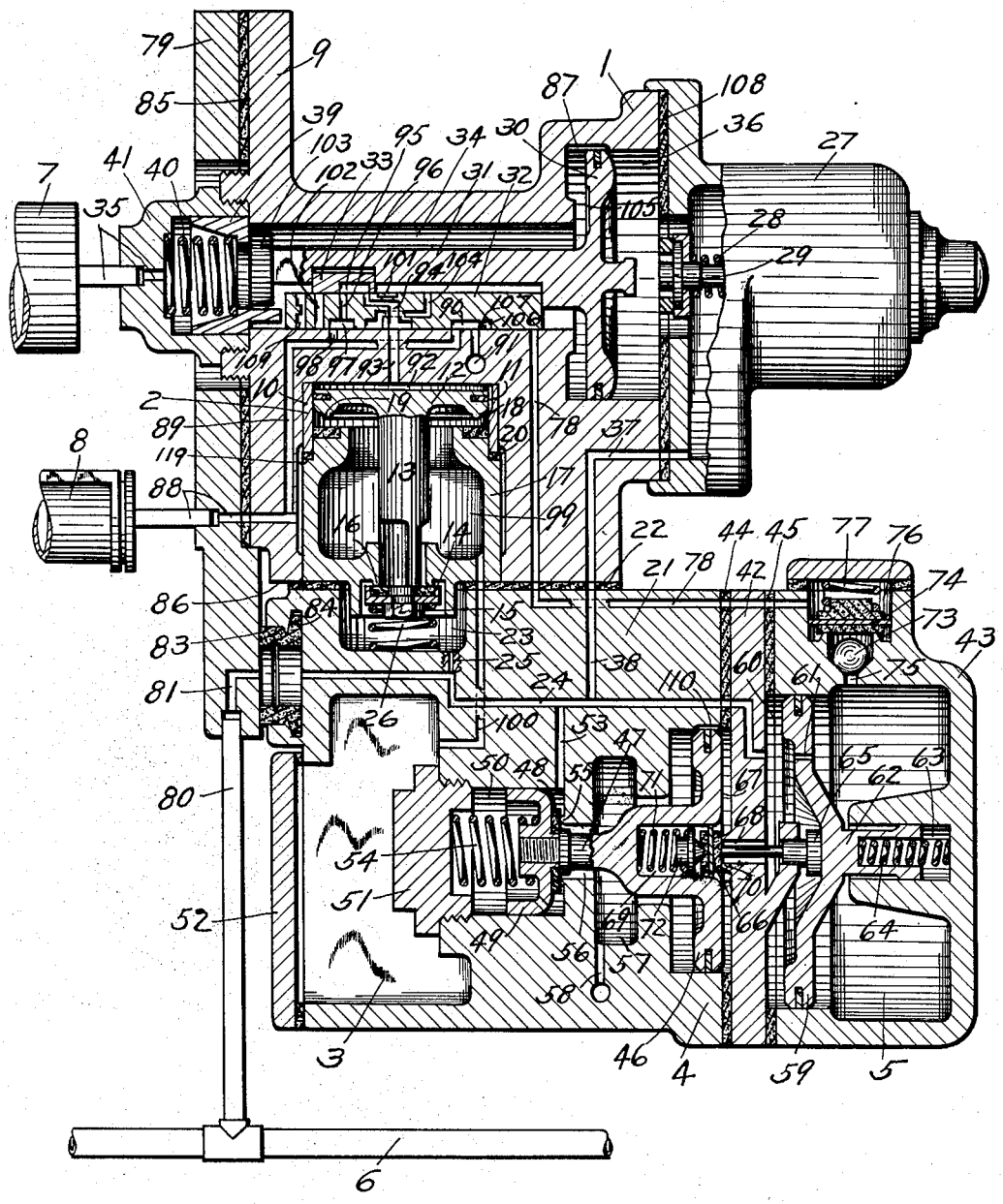
INVENTOR.
CLYDE C. FARMER.
By Wm. N. Cady
ATTORNEY.

Patented Mar. 27, 1934

1,953,009

UNITED STATES PATENT OFFICE 1,953,009

FLUID PRESSURE BRAKE

Clyde C. Farmer, Pittsburgh, Pa., assignor to The Westinghouse Air Brake Company, Wilmerding, Pa., a corporation of Pennsylvania Application June 24, 1932, Serial No. 619,051

23 Claims. (Cl. 303—38)

This invention relates to fluid pressure brake equipment, and more particularly to the type of equipment which functions according to variations in brake pipe pressure to control the application and release of the brakes.

It is desirable that the brakes on each car of a train respond quickly to a reduction in brake pipe pressure to effect an application of the brakes, and also respond quickly to an increase in brake pipe pressure to effect the release of the brakes, and further to so control the application and release of the brakes as to insure the gentle gathering of the slack in the train.

With the equipment now in common use, this desired control may be accomplished in a train of less than one hundred cars, but with the increase of train lengths to one hundred and fifty or more cars the difficulties in controlling the brakes are greatly increased, particularly because of the slow rate of brake pipe reduction due to the length of the train, and to the back flow of fluid from the auxiliary reservoirs to the brake pipe through the feed grooves around the triple valve pistons, all of which contribute to slow up the application of the brakes. On very long trains, the reduction in brake pipe pressure may be so slow that the brakes on the cars at the rear end of the train may not be applied, and in order to insure an application on each car of such a train it is necessary, with the equipment at present employed, to effect an excessively heavy reduction in brake pipe pressure. This is, of course, very objectionable for the reason that it causes the brakes on the cars at the head end of the train to apply so much in advance of the brakes on the cars at the rear end of the train that excessive shocks are produced by the run in of the rear cars on the head cars.

Difficulty is also encountered in effecting the release of the brakes and the recharge of the equipment on a long train, due to the fluid, which is supplied to the brake pipe only at one end of the train, having to flow to the other end, and the consequent slow increase in brake pipe pressure on the cars at the rear end of the train as compared to the more rapid increase in brake pipe pressure on the cars at the head end of the train.

The principal object of my present invention is to so modify the triple valve device of the fluid pressure brake equipment now in common use, that it will function, when used with such equipment in place of the old triple valve device as originally constructed, to improve the operating characteristics of the equipment in such a manner that the above enumerated difficulties, experienced with the old equipment, will be eliminated.

Another object of my invention is to provide an improved quick action mechanism which may be applied to an existing triple valve device without complicated or costly alterations to the triple valve device.

A further object of the invention is to provide an improved quick action mechanism which will respond quickly to a sudden reduction in brake pipe pressure to vent fluid under pressure from the brake pipe to the atmosphere.

Other objects and advantages will appear in the following more detailed description of the invention.

In the accompanying drawing, the single figure is a diagrammatic view, mainly in section, of a fluid pressure brake equipment embodying my invention.

As shown in the drawing, my improved equipment may comprise a triple valve device 1, a quick service valve mechanism 2, a quick service reservoir or chamber 3, a quick action mechanism 4, a quick action reservoir or chamber 5, a brake pipe 6, an auxiliary reservoir 7 and a brake cylinder 8.

In the present embodiment of the invention, the triple valve device is of the well known "K" type which has been so modified, in accordance with my invention, that when employed in brake equipment of the type now in common use, in place of the triple valve device as originally constructed, it will greatly improve the operating characteristics of the equipment, especially on trains of greater length than the old equipment was originally designed to control.

In modifying an old triple valve device of the type just referred to, the check valve casing, check valve mechanism, and quick action mechanism are removed from the triple valve casing 9 leaving the recess, from which the quick action mechanism has been removed, open at one end.

The quick action piston bushing 10, mounted in the casing 9, is retained and at its inner end is provided with a groove 11.

The quick service mechanism 2 is new and comprises a piston 12, which has slidable engagement with the bushing 10 and is adapted to open and close communication through the groove 11. The piston has a stem 13 for operating a quick service vent valve 14 which, in the present embodiment of the invention, is secured to the end of the stem by a nut 15. This valve 14 is adapted to engage an annular seat rib 16 formed on a hollow filler member 17, the major portion of which member has a slip fit with the casing 9 within the recess from which the quick action mechanism has been removed. The inner end portion of this member is of smaller diameter than the outer portion and has a slip fit with the interior surface of the outer end portion of the bushing 10. An annular gasket 18 is mounted on the inner end of the filler member which is adapted to be engaged by an annular rib 19 on the piston 12. The filler member is also provided with an exterior annular shoulder 119 and between this shoulder and the outer end of the bushing 10 there is clamped an annular gasket 20.

Secured to the triple valve casing 9 and clamping the filler member 17 in place is a casing section 21 containing a portion of the quick action mechanism 4, there being a gasket 22 interposed between the casing section 21 and the triple valve casing 9 and the filler member 17.

With the casing section 21 secured to the triple valve casing 9, the filler member 17 and casing section 21 define a chamber 23 to which a brake pipe passage 24 is open through a choke plug 25 having screw-threaded connection with the casing section 21. The valve 14 is contained in chamber 23 and is subjected at all times to the pressure of a coil spring 26, which is also contained in the chamber 23 and which is interposed between and engages the valve and the casing 21.

The old piston chamber cap 27, carrying the graduating spring 28 and stop 29, is used without change and is secured, in its original position, to the casing 9 in the usual manner.

In the present embodiment of the invention, a new triple valve piston 30 is preferably employed, having a stem 31 adapted to actuate a new main slide valve 32 and a new graduating slide valve 33 contained in the old valve chamber 34, which is open to the auxiliary reservoir 7 through a passage and pipe 35. The piston chamber 36, at one side of the piston 30, is open to the passage 24 through the old brake pipe passage 37 and a registering passage 38 in the casing section 21.

The retarded release stop 39 and retarded release spring 40 are used without change and are contained in the old cage member 41, which has screw-threaded connection with the triple valve casing 9.

The casing for the quick action mechanism besides comprising the casing section 21 also comprises a filler member 42, which is suitably clamped to the casing section 21 by a cap 43, there being a gasket 44 interposed between the clamping face of the casing section 21 and one clamping face of the filler member 42 and there being a gasket 45 interposed between the other clamping face of the filler member and the clamping face of the cap 43.

The quick action mechanism may comprise a piston 46 having a stem 47 carrying a vent valve 48, which is secured to the stem by a guide member 49 having screw-threaded connection with the stem, said guide member slidably engaging the casing section 21 within a chamber 50 leading inwardly from the quick service chamber 3. The chamber 50 is closed off from the chamber 3 by means of a cap nut 51 having screw-threaded connection with the casing section 21, said cap nut being accessible for removal or replacement by way of an opening in the casing section, which is normally closed by a plate 52 secured to the casing section 21.

The vent valve chamber 50 is open to the brake pipe passage 24 through a branch passage 53 and contains a spring 54, which is interposed between and engages the cap nut 51 and one side of the guide member 49 and which acts, through the medium of the guide member, to normally maintain the vent valve 48 seated on an annular seat rib 55 formed on the casing section 21, so as to normally maintain closed a communication from the valve chamber 50 and consequently from the brake pipe passage 24 to a passage 56 leading to the atmosphere by way of a chamber 57 at one side of the vent valve piston and a passage 58.

The quick action mechanism also comprises a quick action piston 59 having at one side the quick action chamber 5 and at the other side a chamber 60 to which the brake pipe passage 24 leads and which is in communication with the quick action chamber 5 through a small port 61 in the piston 59. The piston 59 is provided with a stem 62, which is slidably guided by the cap 43 within a bore 63 in a guide projection carried by the cap. Contained in the bore 63 and interposed between and engaging the piston stem 62 and the cap 43 is a spring 64, which acts to normally maintain the piston 59 in the position in which it is shown in the drawing.

The quick action piston is adapted to control the operation of a plunger 65, which is slidably mounted in the filler member 42 and which, in turn, is adapted to control the operation of a valve 66 for opening and closing a communication between the vent valve piston chamber 67 and a passage 68 leading from the quick action piston chamber 60. In the present embodiment of the invention the valve 66 is slidably guided by the piston 46 and stem 47 within a central bore 69 and is normally held seated on a seat rib 70, carried by the filler member 42, by a coil spring 71 acting through the medium of a follower 72, the spring and follower being contained in the bore 69.

A check valve device is mounted in the cap 43, which may comprise a ball check valve 73 and a disk check valve 74 arranged in series. The quick action chamber 5 is open to the under side of the ball check valve 73 through a passage 75. The check valve 74 is contained in a chamber 76 and is normally maintained closed by the action of a coil spring 77 contained in chamber 76. Leading from this chamber 76 to the seat of the triple valve main slide valve 32 is a passage 78, the portion of the passage which extends through the triple valve casing 9 being the old quick service passage.

The triple valve casing 9 is secured to a pipe bracket 79, which may be secured to and supported by any desired fixed member of a vehicle body.

The brake pipe 6 is open to the brake pipe passage 24 through a branch pipe 80, a passage 81 in the pipe bracket and a tubular gasket 83.

The tubular gasket 83 is provided with an annular end flange 84 which is snapped into a suitable recess formed in the casing section 21 and is thus held in place. The outer end of the gasket extends beyond the end of the casing section 21 and is adapted to be forced into close sealing engagement with the pipe bracket when the triple valve casing 9 is secured to the bracket. In practice, the machining of the faces 85 of the triple valve casings is not uniform and, in view of this, the gasket is made of resilient material, so as to insure a tight seal being made between the pipe bracket 79 and the casing section 21 regardless of such variations. There are also variations in the machining of the faces 86 of triple valve casings and in view of this, the passage through the gasket is made large enough to insure, in all cases, an open communication between the passages 81 and 24.

In operation, to initially charge the brake equipment, fluid under pressure is supplied to the brake pipe 6 in the usual manner. Fluid under pressure thus supplied to the brake pipe flows therefrom to the triple valve piston chamber 36 by way of pipe 80, passage 81, the passage through the gasket 83 and passages 24, 38 and 37. From the passage 24, fluid under pressure flows through the choke 25 to the chamber 23 of the quick service mechanism. Fluid also flows from the passage 24 through passage 53 to the quick action vent valve chamber 50 and also flows to the quick action piston chamber 60 and from thence flows through the small port 61 in the quick action piston 59 to the quick action chamber 5, thereby charging the quick action chamber to brake pipe pressure.

With the triple valve parts in full release position as shown in the drawing, fluid under pressure supplied to the triple valve piston chamber 36 flows through a feed groove 87 around the piston 30 to the valve chamber 34 and from thence flows through passage and pipe 35 to the auxiliary reservoir 7, thereby charging the auxiliary reservoir to brake pipe pressure.

Further, with the triple valve parts in full release position, the brake cylinder 8 is open to the atmosphere by way of a pipe and passage 88, the old brake cylinder passage 89 which is in registration with the passage 88, a cavity 90 in the main slide valve 32, and the old atmospheric port 91.

With the triple valve slide valves 32 and 33 in full release position, the quick service piston chamber 92 is open to the atmosphere through a passage 93, a port 94 in the main slide valve 32, a cavity 95 in the graduating slide valve 33, a port 96 and connected cavity 97 in the main slide valve, a passage 98 and passage 89. The quick service chamber 3 is open to the chamber 99 defined by the hollow filler member 17, mounted in the triple valve casing 9, through a passage 100, and since the groove 11 around the quick service piston 12 is open when the piston is in its normal position as shown in the drawing, said chambers are also open to the atmosphere by way of piston chamber 92. With the piston chamber 92 at atmospheric pressure, the pressure of the spring 26 maintains the quick service valve 14 closed and the piston 12 in its normal position.

When it is desired to effect a service application of the brakes, fluid under pressure is gradually vented from the brake pipe 6 and consequently from the triple valve piston chamber 36, through the medium of the usual brake valve device (not shown). When the pressure of fluid in the piston chamber 36 is thus reduced slightly below auxiliary reservoir pressure in valve chamber 34, fluid under pressure in said valve chamber causes the piston to move outwardly, i. e., in the direction toward the right hand, closing the feed groove 87 so as to prevent back flow of fluid from the chamber 34 to the brake pipe by way of the feed groove and piston chamber 36. As the piston is thus moved, it shifts the graduating slide valve 33 in the same direction relative to the main slide valve 32. After the feed groove 87 is closed, the cavity 95 in the graduating valve 33 connects a cavity 101 in the top of the main slide valve to the port 94 in the main slide valve. At substantially the same time as this connection is established, the graduating valve laps the passage 96, which is open to the atmosphere, and uncovers the usual service port 102 in the main slide valve. When the service port is thus uncovered a collar 103 operatively engages the rear end of the main slide valve 32.

With the cavity 101 and port 94 connected as just described, fluid under pressure is supplied by way of this connection and passage 93 from the valve chamber 34 and connected auxiliary reservoir 7 to the quick service piston chamber 92, causing the piston 12 to move inwardly, against the opposing pressure of the spring 26, to unseat the quick service valve 14. With the valve 14 thus unseated, fluid under pressure is vented from the brake pipe to the quick service chamber 3 by way of pipe 80, passages 81 and 24, choke 25, chamber 23, past the unseated valve 14 and a fluted portion of the quick service piston stem 13, chamber 99 and passage 100. The piston 12 in its traverse, first closes the groove 11 and then the annular rib 19 on the piston engages the gasket 18 mounted on the hollow filler member 17. The flow of fluid from the brake pipe to the chamber 3, causes a local reduction in brake pipe pressure which acts to effect the prompt movement of the triple valve parts on the next car in a train to quick service position, and since the triple valve device on each car of the train will function in substantially the same manner, the quick service action will be promptly transmitted from one car to the next throughout the length of the train.

It will be understood that the choke 25 so governs the quick service flow of fluid from the brake pipe that the rate of reduction in brake pipe pressure, due to such flow, will not exceed a service rate.

When the brake pipe pressure in the triple valve piston chamber 36 is reduced, by the local flow of fluid from the brake pipe to the quick service chamber 3, sufficiently below the auxiliary reservoir pressure in the valve chamber 34 that the pressure differential created on the piston 30 is great enough to overcome the resistance offered by the piston and main slide valve 32 to movement, the piston will move outwardly to service position carrying the slide valves with it.

The main slide valve, in its traverse from quick service position to service position, closes communication from the brake cylinder to the atmosphere by lapping the brake cylinder passage 89 and brings the service port 102, which has been previously uncovered by the graduating valve, into registration with the passage 98 opening into the brake cylinder passage 89. Fluid under pressure now flows from the valve chamber 34 and connected auxiliary reservoir 7 to the brake cylinder by way of the service port 102, passages 98 and 89 and passage and pipe 88, so that an application of the brakes is effected.

Further, the main slide valve in its traverse toward service position closes communication from the triple valve chamber 34 to the quick service piston chamber 92 by way of the port 94, and in service position establishes another communication from the chamber 34 to the quick service piston chamber 92 by way of a port 104, which has been brought into registration with passage 93. It will thus be seen that the quick service piston 12 will be maintained in sealing engagement with the gasket 18 and will, of course, hold the quick service valve 14 open, so that fluid under pressure will continue to flow from the brake pipe to the quick service chamber 3 until such time as the brake pipe equalizes into the chamber.

This continued quick service reduction in brake pipe pressure insures the triple valve piston remaining in service position until the desired brake cylinder pressure is developed.

It will be apparent from the foregoing description of the quick service venting of fluid under pressure from the brake pipe that upon a predetermined light reduction in brake pipe pressure, sufficient to cause the triple valve parts to move to the first quick service position, the quick service mechanism will function to insure a predetermined brake cylinder pressure being developed.

When the auxiliary reservoir pressure in the quick service piston chamber 92 is reduced by the flow of fluid from the valve chamber 34 to the brake cylinder to substantially the brake pipe pressure in chamber 99 and connected quick service reservoir 3, the spring 26 acts to move the quick service piston 12 to its outer position in which it is shown in the drawing and in which the quick service valve 14 is seated, closing the communication between the brake pipe and the quick service chamber 3.

When, with the triple valve parts in service position, the auxiliary reservoir pressure in valve chamber 34 is reduced, by the flow of fluid therefrom to the brake cylinder, slightly below the reduced brake pipe pressure in the triple valve piston chamber 36, the triple valve piston 30 moves rearwardly shifting the graduating valve 33 relative to the main valve 32 to service lap position in which the graduating valve laps the service port 102, thus preventing the further flow of fluid under pressure from the auxiliary reservoir 7 to the brake cylinder.

If less than a full service reduction has been effected and the triple valve piston 36 and graduating slide valve 33 have been moved to lap position as just described, and it is desired to increase the brake cylinder pressure, a further gradual reduction in brake pipe pressure is effected through the medium of the brake valve device, causing the piston 36 and graduating valve to move outwardly from service lap position to service position, in which fluid under pressure is again supplied from the auxiliary reservoir to the brake cylinder, the maximum brake cylinder pressure obtainable upon effecting a full service reduction in brake pipe pressure being the equalized pressures of auxiliary reservoir and brake cylinder. It will here be noted that since the quick service valve 14 is seated, the reduction in brake pipe pressure which is effected to cause the triple valve parts to move from service lap to lap position will have no effect upon the pressure of fluid in the chamber 99 and connected quick service chamber 3, so that the quick service piston 12 and valve 14 will remain in the position in which they are shown in the drawing, consequently no quick service venting of fluid from the brake pipe will take place when the triple valve parts are moved from service lap to service position.

When the brake pipe pressure is reduced at a service rate to effect a service application of the brakes, the quick action mechanism will remain in the position in which it is shown in the drawing, since the port 61 in the quick action piston will permit fluid under pressure to flow at a service rate from the charged quick action chamber 5 to the quick action piston chamber 60 and connected brake pipe passage 24.

When it is desired to effect the release of the brakes after a service application, fluid under pressure is supplied to the brake pipe in the usual manner and the consequent increase in the pressure of fluid in the triple valve piston chamber 36 causes the triple valve piston 30, and thereby the slide valves 32 and 33, to move inwardly toward release position.

On the cars at the rear end of the train, where the increase in brake pipe pressure is at a slower rate than on the cars at the head end of the train, the triple valve piston 30 and slide valves 32 and 33 will be brought to a stop in full release position, as shown in the drawing, by the spring weighted retarded release stop 39 when the rear end of the piston stem 31 engages said stop. On the cars at the front end of the train, where, as before mentioned, the rate of increase in brake pipe pressure is at a faster rate than on the rear cars, the triple valve piston and slide valves do not remain in full release position, but move further rearwardly to retarded release position against the opposing pressure of the retarded release spring 40.

With the triple valve parts in full release position, the auxiliary reservoir is recharged with fluid under pressure from the brake pipe by way of the feed groove 87, which has been opened by the piston in its traverse rearwardly, and fluid under pressure is vented from the brake cylinder 8 to the atmosphere by way of the pipe and passage 88, passage 89, cavity 90 in the main slide valve 32, passage 91 and through the usual retaining valve device (not shown). Throughout this specification, unless otherwise mentioned, it is to be assumed that the retaining valve device is in the position to permit the complete release of fluid under pressure from the brake cylinder.

Further, with the triple valve parts in full release position, fluid under pressure is vented from the quick service chamber 3 to the atmosphere by way of passage 100, chamber 99, groove 11 around the quick service piston 12, quick service piston chamber 92, passage 93, port 94 in the main slide valve 32, cavity 95 in the graduating slide valve 33, port 96 and cavity 97 in the main slide valve, passage 98 and the brake cylinder passage 89.

With the triple valve parts in retarded release position, the rear face of the triple valve piston 30 engages the casing, and fluid under pressure flows from the triple valve piston chamber 36 to the valve chamber 34 and connected auxiliary reservoir 7 at a restricted rate through feed groove 87 and then through a smaller groove 105 in the triple valve piston. In retarded release position, the passage 78 is open to the triple valve chamber 34, so that the flow of fluid from the quick action chamber 5 to the valve chamber 34 through this passage will assist in charging the auxiliary reservoir 7. In the event of the feed groove 87 becoming clogged, the auxiliary reservoir would be substantially fully charged with fluid under pressure flowing from the brake pipe by way of the quick action chamber 5 and passage 78.

Further, in the retarded release position of the triple valve parts, the brake cylinder passage 89 is open to the cavity 90 in the main slide valve 32 and a retarded release cavity 106, which is connected to the cavity 90 through a choked connection 107, is in registration with the passage 91, so that the release of fluid under pressure from the brake cylinder and quick service chamber 3 is at a slower rate as governed by the connection 107.

When, with the triple valve parts in retarded release position, the auxiliary reservoir pressure in valve chamber 34 is increased to substantially the pressure of fluid in the triple valve piston chamber 36, the retarded release spring 40, acting through the medium of the retarded release stop 39 and piston stem 31, moves the triple valve piston 30 and slide valves 32 and 33 to full release position.

In the retarded release position of the triple valve parts, the port 94 and cavity 97 in the main slide valve 32 are in communication with the passages 93 and 98 respectively, so that fluid under pressure is vented from the quick service chamber 3 in substantially the same manner as when the triple valve parts are in full release position. This venting of fluid from the chamber 3 is desirable for the reason that if the triple valve parts should fail to move from retarded release position to full release position upon the recharge of the equipment, quick service action will be obtained upon a subsequent application of the brakes.

On the cars at the head end of the train, there would be a possibility of the quick action chamber 5 being charged to a pressure greater than that normally carried in the brake pipe which, if permitted, would tend to cause the quick action mechanism to operate to effect an undesired emergency application of the brakes when the brake pipe pressure reduces to that normally carried upon the usual movement of the brake valve device from release to running position. This possibility of an overcharge in the quick action chamber is entirely eliminated in my present equipment, for the reason that fluid under pressure in the chamber 5 is free to equalize into the valve chamber 34 by way of passage 75, past the check valves 73 and 74, check valve chamber 76 and passage 78.

The check valves 73 and 74, interposed in the communication between the quick action chamber 5 and the valve chamber 34, are for the purpose of preventing back flow of fluid from the chamber 34 and connected auxiliary reservoir 7 to the quick action chamber 5 in the event of the triple valve parts being in retarded release position when the brake pipe pressure is reduced to effect a service application of the brakes. If it were not for the check valves, there would be an open communication through which fluid would flow from the chamber 34 and auxiliary reservoir to the quick action chamber 5 when the triple valve parts are in retarded release position and a service reduction in brake pipe pressure is effected. With the volumes of the auxiliary reservoir 7 and valve chamber 34 added to that of the quick action chamber, the port 61 in the quick action piston 59 would not permit fluid under pressure to flow from the chamber 5 to the brake pipe sufficiently fast to prevent fluid under pressure in said chamber 5 from causing the quick action piston from moving from the position in which is shown in the drawing to emergency position, consequently an undesired emergency application of the brakes would be effected. By the use of the check valves 73 and 74, this undesired operation of the quick action mechanism is prevented.

When it is desired to effect an emergency application of the brakes, a sudden reduction in brake pipe pressure is effected and this sudden reduction being effective in the triple valve piston chamber 36, fluid at auxiliary reservoir pressure in valve chamber 34 causes the triple valve parts to move to emergency position, in which the piston 30 engages a gasket 108 interposed between the casing 9 and the cap 27, and in which an emergency port 109 registers with the passage 98 leading to the brake cylinder passage 89, so that fluid under pressure is supplied from the auxiliary reservoir 7 to the brake cylinder 8 for applying the brakes.

This sudden reduction in brake pipe pressure causes a corresponding sudden reduction to be effected in the quick action piston chamber 60, and since the port 61 in the quick action piston 59 will only permit the flow of fluid from the quick action chamber 5 to the piston chamber 60 at a service rate, a fluid pressure differential is created on the piston 59 which causes the piston to move outwardly, i. e., in the direction toward the left hand, from the position in which it is shown in the drawing.

As the piston thus moves, it shifts the plunger 65 in the same direction and the plunger unseats the valve 66 against the opposing pressure of the spring 71 acting through the medium of the follower 72. It will here be noted that as the valve 66 is unseated it is slidably guided within the bore 69 in the piston stem 47.

When the valve is thus unseated, fluid under pressure flows through passage 68 from the quick action piston chamber 60 to the piston chamber 67. Fluid under pressure thus supplied to the chamber 67, causes the piston 46 to move in the direction toward the left hand, and said piston, through the medium of its stem 47, moves the quick action vent valve 48 from its seat rib, so that fluid under pressure is now vented from the brake pipe, quick action piston chamber 60 and piston chamber 67 by way of brake pipe passage 24, passage 53, quick action vent valve chamber 50, past the open vent valve 55, passage 56, chamber 57 and passage 58.

Now, when fluid under pressure is substantially completely vented from the brake pipe and quick action chamber 5, the spring 54 acts to seat the vent valve 55 and the spring 71 acts to seat the valve 66. As the valve 66 is being seated it moves the plunger 65 in the direction toward the right hand to the position in which it is shown in the drawing against the opposing pressure of the light spring 64.

In effecting an emergency application, the quick service mechanism will function to locally vent fluid under pressure from the brake pipe to the atmosphere, but this is of little or no importance, for the reason that the quick action mechanism will promptly function to quickly propagate the emergency action throughout the length of the train.

To effect a release of the brakes after an emergency application, the brake pipe is again charged with fluid under pressure, which causes the triple valve parts to move either to full release position or retarded release position according to the rate of increase in brake pipe pressure. The auxiliary reservoir 7 is now charged with fluid under pressure from the brake pipe, and fluid under pressure is released from the brake cylinder 8 in the same manner as in effecting a release of the brakes after a service application.

It will be noticed that there is a groove 110 in the casing section 21, which connects the piston chamber 67 to the chamber 57 open to the atmosphere when the piston 46 is in its normal position as shown in the drawing. This is a leakage groove which will permit fluid, which may leak from the quick action piston chamber 60 past the seated valve 66, to flow to the atmosphere, so that a pressure differential on the piston 46, due to such leakage, cannot be created, thus preventing unintentional operation of the piston 46 to open the quick action vent valve 48 and a consequent emergency application of the brakes.

When it is desired to retain pressure in the brake cylinder, as when the train is descending a grade, the retaining valve device is turned to the position to retain a predetermined pressure in the brake cylinder. When the brake pipe pressure is reduced to effect the first application on the grade, the triple valve parts and quick service mechanism function in the same manner to effect an application of the brakes as when a service application, before described, is initiated. Now, when the brake pipe pressure is increased and the triple valve parts have been moved to a release position for recharging the auxiliary reservoir 7 with fluid under pressure from the brake pipe, fluid under pressure is vented from the brake cylinder to the atmosphere through the passage 91 and retaining valve device, said retaining valve device functioning to retain a predetermined pressure, say for instance ten pounds, in the brake cylinder.

With the triple valve parts in a release position, fluid under pressure is vented from the quick service chamber 3 to the atmosphere in the same manner as when the parts are in release position in releasing the brakes after a service application. It will, however, be understood that since the flow of fluid from the quick service chamber 3 to the atmosphere is by way of the brake cylinder passage 89, the pressure of fluid retained in the quick service chamber will be the same as that of the fluid retained in the brake cylinder.

Upon succeeding applications of the brakes, the quick service mechanism will function to vent fluid under pressure from the brake pipe to the quick service chamber 3 in the same manner as when the initial application is effected, but due to the retained pressure in the chamber 3 the amount of local reduction in brake pipe pressure will be less. By thus limiting the quick service reduction in brake pipe pressure, an excessively heavy application of the brakes is prevented.

It will be understood that when triple valve devices, modified in accordance with my invention, are used in the fluid pressure brake equipments now in common use, the operating characteristics of such equipments will be so improved that they will function to provide the desired control of the brakes on a much longer train than could be properly controlled when triple valve devices as originally constructed were employed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe, of a salvaged triple valve casing having an open ended chamber from which a quick action mechanism has been removed, a quick service mechanism inserted in said casing through the open end of said chamber, said mechanism being operable by fluid under pressure to vent fluid under pressure from the brake pipe, a quick action mechanism comprising a casing section secured to the triple valve casing and clamping said quick service mechanism to the triple valve casing, and means operative upon a reduction in brake pipe pressure to establish a communication through which fluid under pressure is supplied to the quick service mechanism for effecting the operation of the quick service mechanism to vent fluid under pressure from the brake pipe.

2. In a fluid pressure brake equipment, the combination with a brake pipe, of a salvaged triple valve casing having an open ended chamber from which a quick action mechanism has been removed, a quick service mechanism inserted in said casing through the open end of said chamber, a quick action mechanism comprising a casing section secured to the triple valve casing and clamping said quick service mechanism to the triple valve casing, said casing section having a quick service chamber formed therein, and means operative upon a reduction in brake pipe pressure for effecting the operation of said quick service mechanism to vent fluid under pressure from the brake pipe to said quick service chamber.

3. In a fluid pressure brake equipment, the combination with a brake pipe, of a salvaged triple valve casing having an open ended chamber from which a quick action mechanism has been removed, a quick service mechanism inserted in said casing through the open end of said chamber, said quick service mechanism being operable by fluid under pressure to vent fluid under pressure from the brake pipe, a quick action mechanism comprising a casing section secured to the triple valve casing and clamping said quick service mechanism to the triple valve casing, said casing section having a passage through which fluid under pressure is adapted to be vented from the brake pipe, and means operative upon a reduction in brake pipe pressure to supply fluid under pressure to the quick service mechanism for effecting the operation of the quick service mechanism to establish communication from the brake pipe to said passage.

4. In a fluid pressure brake equipment, the combination with a brake pipe, of a salvaged triple valve casing having an open ended chamber from which a quick action mechanism has been removed, a quick service mechanism inserted in said casing through the open end of said chamber, a quick action mechanism comprising a casing section secured to the triple valve casing and clamping said quick service mechanism to the triple valve casing, said casing section having a passage through which fluid under pressure is adapted to be vented from the brake pipe, means included in said quick service mechanism normally closing communication from the brake pipe to said passage and operative by fluid under pressure for establishing communication from the brake pipe to said passage, and means operated upon a reduction in brake pipe pressure to supply fluid under pressure for operating the first mentioned means.

5. In a fluid pressure brake equipment, the combination with a brake pipe, of a salvaged triple valve casing having an open ended chamber from which a quick action mechanism has been removed, a quick service mechanism inserted in said casing through the open end of said chamber, a quick action mechanism comprising a casing section secured to the triple valve casing and clamping said quick service mechanism to the triple valve casing, said casing section having a quick service chamber formed therein, means included in said quick service mechanism normally establishing communication through which said quick service chamber is connected to the atmosphere and closing a communication from the brake pipe to said quick service chamber and operative by fluid under pressure to establish a communication through which fluid under pressure is vented from the brake pipe to said quick service chamber, and means operated upon a reduction in brake pipe pressure for closing the communication from the quick service chamber to the atmosphere and for supplying fluid under pressure for actuating the quick service mechanism.

6. In a fluid pressure brake equipment, the combination with a brake pipe, a brake cylinder and an auxiliary reservoir normally charged with fluid under pressure, of a salvaged triple valve casing having a chamber from which a quick action mechanism has been removed, means contained in said chamber in place of said quick action mechanism, comprising a piston and a valve adapted to be actuated by said piston to establish a communication through which fluid under pressure is adapted to be vented from the brake pipe, mechanism operated upon a reduction in brake pipe pressure for supplying fluid under pressure from the auxiliary reservoir to one side of said piston for actuating said piston and for supplying fluid under pressure from the auxiliary reservoir to the brake cylinder to effect an application of the brakes, said piston when actuated being subjected to the pressure of fluid vented from the brake pipe, and means for actuating said valve to close said communication upon the substantial equalization of the auxiliary reservoir pressure acting on one side of the piston and with the pressure of fluid vented from the brake pipe and acting on the other side of the piston.

7. In a fluid pressure brake equipment, the combination with a brake pipe and a brake cylinder, of a salvaged triple valve casing from which a quick action mechanism has been removed, a quick service mechanism mounted in said casing in place of the quick action mechanism, said quick service mechanism comprising a member having a chamber through which fluid under pressure is adapted to be vented from the brake pipe, a valve normally closing communication from the brake pipe to said chamber, a piston operative by fluid under pressure to unseat said valve, and valve means operated upon a reduction in brake pipe pressure to first supply fluid under pressure for actuating said piston and to then supply fluid under pressure to the brake cylinder to effect an application and to supply fluid under pressure to maintain the piston in valve unseating position.

8. In a fluid pressure brake equipment, the combination with a brake pipe, of a triple valve device comprising a casing, means mounted in said casing operative upon a gradual reduction in brake pipe pressure for effecting a service application of the brakes and operative upon a sudden reduction in brake pipe pressure for effecting an emergency application of the brakes and operative upon an increase in brake pipe pressure for effecting a release of the brakes, a casing section secured to said triple valve casing, means mounted in said casing section operative upon a sudden reduction in brake pipe pressure to locally vent fluid under pressure from the brake pipe, a pipe bracket to which said triple valve casing is secured, said pipe bracket, casing section and triple valve casing having communicating passages connecting the triple valve device and the means mounted in the casing section with the brake pipe and a tubular gasket interposed between and engaging said pipe bracket and casing section effecting an air-tight seal to prevent leakage of fluid under pressure from the connection between the communicating passages in the pipe bracket and casing section.

9. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under pressure from the brake pipe and comprising a casing section secured to the triple valve casing and spaced away from said pipe bracket, said casing section having a brake pipe passage in communication with the brake pipe passage in the triple valve casing, and a tubular gasket clamped between said casing section and pipe bracket forming an air-tight communication between the brake pipe passages in the pipe bracket and casing section.

10. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under pressure from the brake pipe and comprising a casing section secured to the triple valve casing and spaced away from said pipe bracket, said casing section having a brake pipe passage in communication with the brake pipe passage in the triple valve casing, and a self-adjusting tubular gasket clamped between said casing section and pipe bracket forming an air-tight communication between the brake pipe passages in the pipe bracket and casing section.

11. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under pressure from the brake pipe and comprising a casing section secured to the triple valve casing and spaced away from said pipe bracket, said casing section having a brake pipe passage in communication with the brake pipe passage in the triple valve casing, and a self-adjusting tubular gasket clamped between said casing section and pipe bracket forming an air-tight communication between the brake pipe passages in the pipe bracket and casing section, said gasket being adjustable to compensate for variations in the finishing of the face of the triple valve casing which is clamped to the pipe bracket.

12. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under pressure from the brake pipe and comprising a casing section secured to the triple valve casing and spaced away from said pipe bracket, said casing section having a brake pipe passage in communication with the brake pipe passage in the triple valve casing, and a tubular gasket of compressible material clamped between said casing section and pipe bracket forming an air-tight communication between the brake pipe passages in the pipe bracket and casing section.

13. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under pressure from the brake pipe and comprising a casing section secured to the triple valve casing and spaced away from said pipe bracket, said casing section having a brake pipe passage in communication with the brake pipe passage in the triple valve casing, and a tubular gasket carried by said casing section and clamped into sealing engagement with the pipe bracket to form an air-tight communication between the brake pipe passages in the pipe bracket and casing section.

14. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under pressure from the brake pipe and comprising a casing section secured to the triple valve casing and spaced away from said pipe bracket, said casing section having a brake pipe passage in communication with the brake pipe passage in the triple valve casing, and a tubular gasket clamped between said casing section and pipe bracket forming an air-tight communication between the brake pipe passages in the pipe bracket and casing section, the passage through said gasket being of greater diameter than either the brake pipe passage in the pipe bracket or the brake pipe passage in the casing section to insure an open communication between the last mentioned passages.

15. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under pressure from the brake pipe and comprising a casing section secured to the triple valve casing and spaced away from said pipe bracket, said casing section having a brake pipe passage in communication with the brake pipe passage in the triple valve casing, and a tubular gasket clamped between said casing section and pipe bracket forming an air-tight communication between the brake pipe passages in the pipe bracket and casing section, the passage through said gasket being of greater diameter than either the brake pipe passage in the pipe bracket or the brake pipe passage in the casing section to permit of variations in the positioning of said casing section relative to the pipe bracket without closing the communication between the last mentioned passages.

16. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said salvaged triple valve casing having a brake pipe passage through which the pressure of fluid acting on said means is adapted to be reduced, a pipe bracket to which the triple valve casing is secured, said pipe bracket having a brake pipe passage open to the brake pipe, a quick action mechanism operative upon a sudden reduction in brake pipe pressure for venting fluid under under pressure from the brake pipe and comprising a casing section secured to the triple valve casing and spaced away from said pipe bracket, said casing section having a brake pipe passage in communication with the brake pipe passage in the triple valve casing, and a tubular gasket of compressible material carried by said casing section and clamped into sealing engagement with said pipe bracket to form an airtight communication between the brake pipe passages in the pipe bracket and casing section, the passage through said gasket being of greater diameter than either of the last mentioned brake pipe passages to permit variations in the positioning of the casing section relative to the pipe bracket without closing the communication between the passages and to prevent the gasket when compressed from closing the communication between the passages.

17. In a fluid pressure brake equipment, the combination with a brake pipe, of a triple valve device operative upon a gradual reduction in brake pipe pressure for effecting a service application of the brakes and operative upon a sudden reduction in brake pipe pressure for effecting an emergency application of the brakes, a normally closed quick action vent valve operative to locally vent fluid under pressure from the brake pipe, a movable abutment operative by fluid under pressure for actuating said valve, a normally seated valve operative to supply fluid under pressure for actuating said movable abutment, means operated upon a sudden reduction in brake pipe pressure for actuating the last mentioned valve, and means interposed between and engaging said abutment and last mentioned valve exerting a seating pressure on the valve.

18. In a fluid pressure brake equipment, the combination with a brake pipe, of a triple valve device operative upon a gradual reduction in brake pipe pressure for effecting a service application of the brakes and operative upon a sudden reduction in brake pipe pressure for effecting an emergency application of the brakes, a normally closed quick action vent valve operative to locally vent fluid under pressure from the brake pipe, a movable abutment operative by fluid under pressure for actuating said valve, a normally seated valve operative to supply fluid under pressure for actuating said movable abutment, a movable stem for actuating said valve, means operated upon a sudden reduction in brake pipe pressure for moving said stem to actuate the last mentioned valve, and means engaging the abutment and last mentioned valve exerting a seating pressure on said valve.

19. In a fluid pressure brake equipment, the combination with a brake pipe, of a triple valve device operative upon a gradual reduction in brake pipe pressure for effecting a service application of the brakes and operative upon a sudden reduction in brake pipe pressure for effecting an emergency application of the brakes, a normally closed quick action vent valve operative to locally vent fluid under pressure from the brake pipe, a movable abutment operative by fluid under pressure from the brake pipe for actuating said valve, a normally seated valve operative to subject said movable abutment to the pressure of fluid from the brake pipe, means operative upon a sudden reduction in brake pipe pressure for actuating the last mentioned valve, and means interposed between said abutment and last mentioned valve for maintaining the valve normally seated.

20. In a fluid pressure brake equipment, the combination with a brake pipe, of a triple valve device operative upon a gradual reduction in brake pipe pressure for effecting a service application of the brakes and operative upon a sudden reduction in brake pipe pressure for effecting an emergency application of the brakes, a normally closed quick action vent valve operative to locally vent fluid under pressure from the brake pipe, a movable abutment operative by fluid under pressure for actuating said valve, said movable abutment having a recess open to the pressure face of the abutment, a valve guided by said abutment within said recess, means in said recess normally maintaining the last mentioned valve closed, and means operative upon a sudden reduction in brake pipe pressure for actuating the last mentioned valve.

21. In a fluid pressure brake equipment, the combination with a brake pipe, of a triple valve device operative upon a gradual reduction in brake pipe pressure for effecting a service application of the brakes and operative upon a sudden reduction in brake pipe pressure for effecting an emergency application of the brakes, a quick action chamber normally charged with fluid under pressure, a normally closed quick action vent valve operative to locally vent fluid under pressure from the brake pipe, a piston operative by fluid under pressure for actuating said valve, a normally closed valve operative to supply fluid under pressure for actuating said piston, a movable abutment subject to the opposing pressures of the brake pipe and quick action chamber and operative upon a sudden reduction in brake pipe pressure for actuating the last mentioned valve, and means for venting fluid under pressure from the quick action chamber to the brake pipe at a service rate to prevent the operation of said movable abutment when a gradual reduction in brake pipe pressure is effected.

22. In a fluid pressure brake equipment, the combination with a brake pipe, of a triple valve device operative upon a gradual reduction in brake pipe pressure for effecting a service application of the brakes and operative upon a sudden reduction in brake pipe pressure for effecting an emergency application of the brakes, a quick action chamber normally charged with fluid under pressure, a normally closed quick action vent valve operative to locally vent fluid under pressure from the brake pipe, a piston operative by fluid under pressure for actuating said valve, a normally closed valve operative to supply fluid under pressure for actuating said piston, a movable abutment subject to the opposing pressures of the brake pipe and quick action chamber and operative upon a sudden reduction in brake pipe pressure for actuating the last mentioned valve, and a communication through said movable abutment through which fluid under pressure is vented from the quick action chamber to the brake pipe at a rate at least equal to the rate of reduction in brake pipe pressure in effecting a service application of the brakes to prevent the operation of said abutment in effecting a service application.

23. In a fluid pressure brake equipment, the combination with a brake pipe, of a triple valve device comprising means operated upon a reduction in brake pipe pressure for venting fluid under pressure from the brake pipe and for effecting an application of the brakes, a quick action device comprising a casing having a chamber into which fluid under pressure vented from the brake pipe by said means flows, means mounted in said casing operative upon a sudden reduction in brake pipe pressure for venting fluid under pressure from the brake pipe to the atmosphere, said means comprising a vent valve contained in a bore in said casing extending inwardly from said chamber, a removable member contained in said chamber for closing communication between said chamber and bore, and a member forming one of the walls of said chamber removably secured to said casing for rendering said removable member accessible from the exterior of the casing.

CLYDE C. FARMER.